(12) United States Patent
Tsuyunashi

(10) Patent No.: US 10,431,087 B2
(45) Date of Patent: Oct. 1, 2019

(54) IN-VEHICLE DEVICE

(71) Applicant: DENSO TEN Limited, Kobe-shi, Hyogo (JP)

(72) Inventor: Masashi Tsuyunashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 15/907,731

(22) Filed: Feb. 28, 2018

(65) Prior Publication Data

US 2018/0261092 A1 Sep. 13, 2018

(30) Foreign Application Priority Data

Mar. 13, 2017 (JP) ................................ 2017-047612

(51) Int. Cl.
*G08G 1/14* (2006.01)
*B62D 15/02* (2006.01)

(52) U.S. Cl.
CPC ......... *G08G 1/144* (2013.01); *B62D 15/0285* (2013.01); *G08G 1/146* (2013.01)

(58) Field of Classification Search
CPC combination set(s) only.
See application file for complete search history.

(56) References Cited

U.S. PATENT DOCUMENTS

2013/0116909 A1* 5/2013 Shida .................... B60W 30/16
  701/96
2017/0212511 A1* 7/2017 Paiva Ferreira ....... G06Q 10/08

FOREIGN PATENT DOCUMENTS

JP  2011-054116 A  3/2011
JP  2016-006603 A  1/2016

* cited by examiner

*Primary Examiner* — Thomas S McCormack
(74) *Attorney, Agent, or Firm* — Oliff PLC

(57) ABSTRACT

An in-vehicle device that is mounted on a host vehicle, the in-vehicle device includes a receiver, and an electronic control unit. The receiver receives an exit instruction. The electronic control unit (a) determines whether or not other vehicles exist on an exit travel route from a current parking position of the host vehicle to a getting-on area when the exit instruction has been received by the receiver, and (b) requests the other vehicles existing on the exit travel route to move out of the exit travel route using vehicle-to-vehicle communication in a case where the electronic control unit determines that the other vehicles exist on the exit travel route.

11 Claims, 5 Drawing Sheets

IN-VEHICLE DEVICE

BACKGROUND OF THE INVENTION

Field of the Invention

The invention relates to a technology that controls exiting of a vehicle in a valet parking lot.

Description of the Background Art

Parking lots are mainly divided into two types of parking lots. One type is a self-parking lot and the other type is a valet parking lot.

The self-parking lot is a parking lot in which a vehicle is moved to a parking position by user's driving of the vehicle when entering the parking lot and the vehicle is moved from the parking position by the user's driving of the vehicle when exiting the parking lot. Therefore, in the self-parking lot, the user of the vehicle gets on or off the vehicle in the parking position.

The valet parking lot is a parking lot in which the vehicle is moved from a getting-off area to the parking position by a method other than the user's driving of the vehicle after the user of the vehicle gets off the vehicle in the getting-off area when entering the parking lot, and the user of the vehicle gets on the vehicle in a getting-on area after the vehicle is moved from the parking position to the getting-on area by the method other than the user's driving of the vehicle when exiting the parking lot.

By the way, in recent years, a development of an autonomous driving technology that enables a vehicle to drive autonomously has been energetically advanced. In the valet parking lot, a parking management system using an autonomous driving function of the vehicle has been proposed.

In this parking management system, a management center grasps the parking position of an exiting target vehicle, the getting-on area and other vehicles traveling on a traveling road within the parking lot, and determines an exit travel route from the parking position of the exiting target vehicle to the getting-on area based on grasped information.

In this parking management system, since a driver does not get on or off the vehicle in each parking position, it is possible to make a parking frame slightly narrower than a conventional parking frame. However, in this parking management system, since the traveling road is provided in front of each parking position (each parking frame), a number of vehicles that can be parked relative to an area of the parking lot has not changed much compared to before.

Here, when attempting an efficient parking to increase the number of vehicles that can be parked, relative to the area of the parking lot, without being limited by a concept of the parking frame, there is a possibility that the other vehicles may exist on the traveling route of the exiting vehicle and become obstacles that hinder the exiting vehicle from exiting the parking lot.

SUMMARY OF THE INVENTION

According to one aspect of the invention, an in-vehicle device that is mounted on a host vehicle, the in-vehicle device includes: a receiver that receives an exit instruction; and an electronic control unit that: (a) determines whether or not other vehicles exist on an exit travel route from a current parking position of the host vehicle to a getting-on area when the exit instruction has been received by the receiver; and (b) requests the other vehicles existing on the exit travel route to move out of the exit travel route using vehicle-to-vehicle communication in a case where the electronic control unit determines that the other vehicles exist on the exit travel route.

Thus, it is possible to allow the vehicle to smoothly exit the parking lot even under a situation that an efficient parking is performed.

According to another aspect of the invention, in the in-vehicle device according to the above aspect, in a case where the electronic control unit determines that the other vehicles exist on the exit travel route, the electronic control unit creates a moving plan for the other vehicles existing on the exit travel route, and transmits the moving plan to the other vehicles existing on the exit travel route when requesting the other vehicles to move out of the exit travel route.

Thus, it is possible to allow the vehicles including the other vehicles to smoothly exit the parking lot even under a situation that an efficient parking is performed.

Therefore, an object of the invention is to provide a technology that can allow the vehicles to smoothly exit the parking lot even under a situation that an efficient parking is performed.

These and other objects, features, aspects and advantages of the invention will become more apparent from the following detailed description of the invention when taken in conjunction with the accompanying drawings.

DESCRIPTION OF THE EMBODIMENTS

An exemplified embodiment of the invention will be described below in detail with reference to the drawings.

<1. Configuration Example of Parking Management System>

Figure 1:
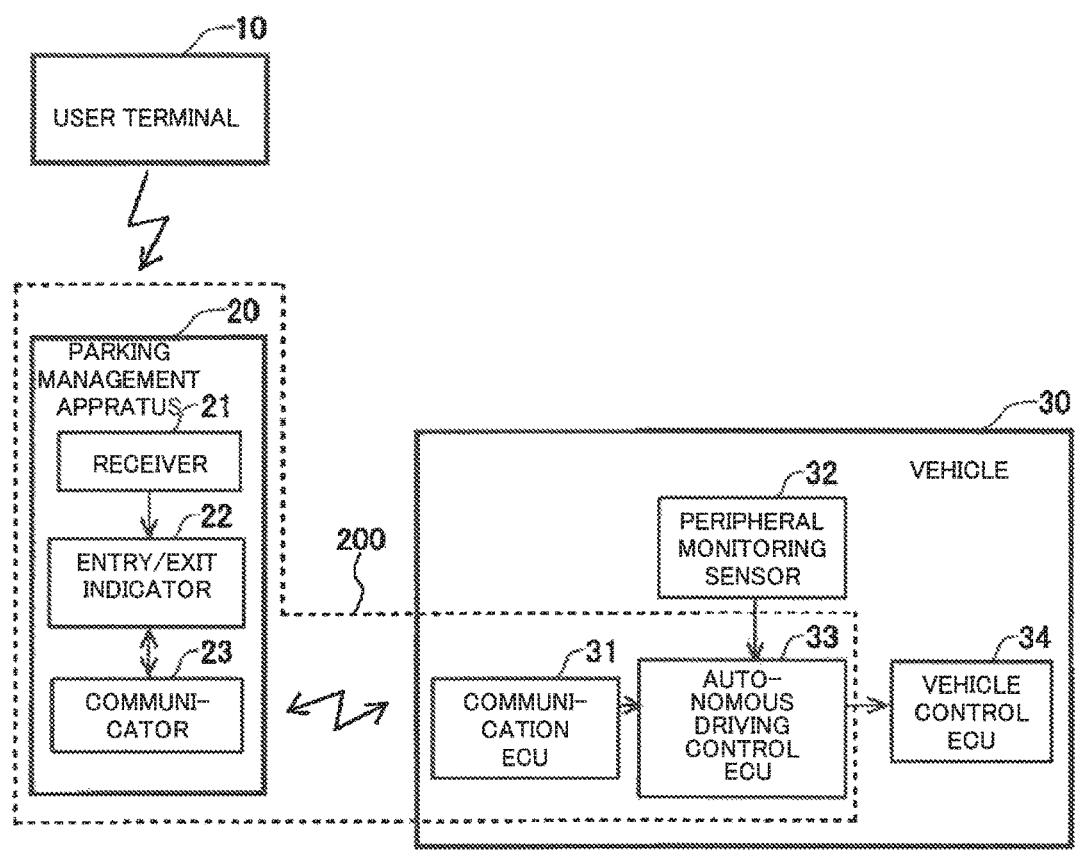
FIG. 1 illustrates a configuration example of a parking management system.

FIG. 1 illustrates a configuration example of a parking management system. A parking management system 200 illustrated in FIG. 1 includes a parking management apparatus 20, a communication ECU (electronic control unit) 31 and an autonomous driving control ECU 33, and performs a parking management in a valet parking lot in which an entry to and exit from the parking lot using an autonomous driving function of a vehicle 30 is implemented.

The parking management apparatus 20 includes a receiver 21 and an entry/exit indicator 22, and a communicator 23.

The receiver 21 receives an entry request signal that requests entering the parking lot and an exit request signal that requests exiting the parking lot, respectively. The entry request signal is transmitted from a user terminal 10 owned by a user of a vehicle who wishes to let the vehicle enter a parking area of the valet parking lot. The exit request signal is transmitted from the user terminal 10 owned by the user of the vehicle who wishes to let the vehicle exit the parking area of the valet parking lot.

The user terminal 10 is a portable electronic device carried by the user, and for example, a smartphone, a tablet, a mobile phone, a PDA (personal digital assistant), or the like, can be used. A reception terminal is installed in a vicinity of a getting-off area or getting-on area of the valet parking lot, and the reception terminal may be used instead of the user terminal 10.

The entry/exit indicator 22 creates an entry plan for the vehicle 30 requested to enter the parking lot by the entry request signal. The entry plan includes a set of transit points and transit times. An entry travel route from the getting-off area to a parking position is determined by the entry plan. Furthermore, the entry/exit indicator 22 creates an exit plan for the vehicle 30 requested to exit the parking lot by the exit request signal. The exit plan also includes a set of transit points and transit times. An exit travel route from the parking position to the getting-on area is determined by the exit plan.

The entry/exit indicator 22 can include, for example, a controller and a memory. The controller is a computer that includes a CPU (central processing unit), a RAM (random access memory) and a ROM (read only memory). The memory stores a computer program, map information within the valet parking lot, parking position information of each vehicle within the valet parking lot, and the like, in a non-volatile manner. As the memory, for example, an EEPROM, a flash memory, a hard disk drive, or the like, can be used. Each of the ECUs 31, 33 and 34 also are computers having a CPU, RAM and ROM, for example.

The communicator 23 transmits the entry plan as an entry instruction to the vehicle 30 requested to enter the parking lot by the entry request signal. Furthermore, the communicator 23 transmits the exit plan as an exit instruction to the vehicle 30 requested to exit the parking lot by the exit request signal.

The vehicle 30 includes the above-described communication ECU 31, a peripheral monitoring sensor 32, the autonomous driving control ECU 33 and a vehicle control ECU 34.

The communication ECU 31 receives information to be transmitted from the communicator 23. The communicator 23 and the communication ECU 31 may be directly communicated with each other, or may be communicated with each other via a repeater installed in the parking area within the valet parking lot. In a case where the repeater is used, for example, the communicator 23 and the repeater can be connected with each other by wire communication network.

The peripheral monitoring sensor 32 monitors a peripheral situation of the vehicle 30 by using an image capturing apparatus or a millimeter-wave radar.

The autonomous driving control ECU 33 allows the vehicle 30 to autonomously drive along the entry travel route based on the entry plan acquired by the communication ECU 31, and allows the vehicle 30 to autonomously drive along the exit travel route based on the exit plan acquired by the communication ECU 31. Furthermore, in a case where an obstacle around the vehicle 30 is detected by the peripheral monitoring sensor 32, the autonomous driving control ECU 33 autonomously executes a travel stop to avoid a collision between the obstacle and the vehicle 30.

The vehicle control ECU 34 controls a vehicle direction, a vehicle speed, and the like, according to a command output from the autonomous driving control ECU 33.

<2. Operation Example Related to Exiting by Parking Management System>

Figure 2:
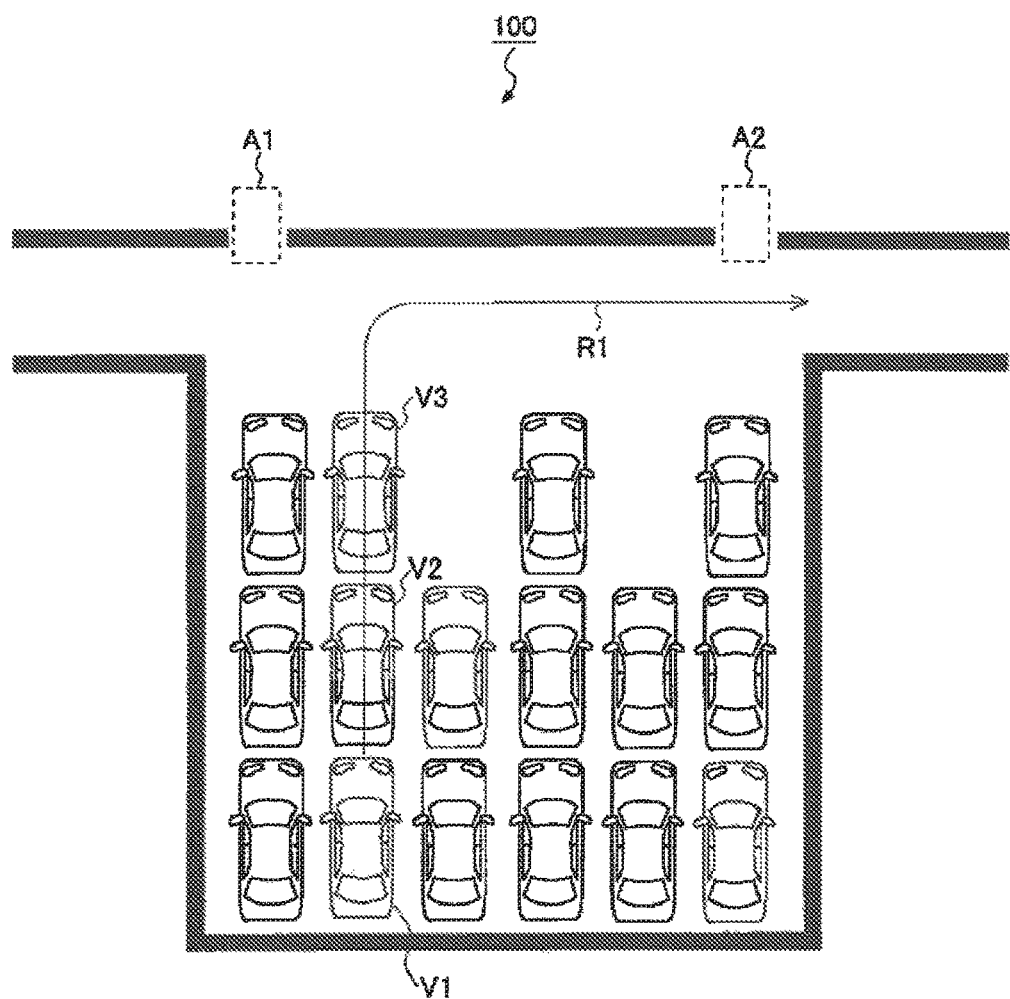
FIG. 2 is a top view illustrating an example of a parking situation in a valet parking lot.

FIG. 2 is a top view illustrating an example of a parking situation in the valet parking lot. A valet parking lot 100 illustrated in FIG. 2 is a parking lot in which the vehicle is moved from a getting-off area A1 to the parking position within the parking area by autonomous driving after the user of the vehicle gets off the vehicle in the getting-off area A1 when entering the parking lot, and the user of the vehicle gets on the vehicle in a getting-on area A2 after the vehicle is moved from the parking position within the parking area to the getting-on area A2 by the autonomous driving when exiting the parking lot. Furthermore, in the valet parking lot 100, no parking frame is provided and each vehicle is parked in a state in which an interval between adjacent vehicles is reduced not only in a left-right direction but also in a front-rear direction and the traveling route is blocked by other vehicles, except for the vehicles in the first row. That is, the traveling routes in the front-rear direction and in the left-right direction are blocked by other vehicles, except for the vehicles in the first row. There is no detour route, except for the vehicles in the first row.

Figure 3:
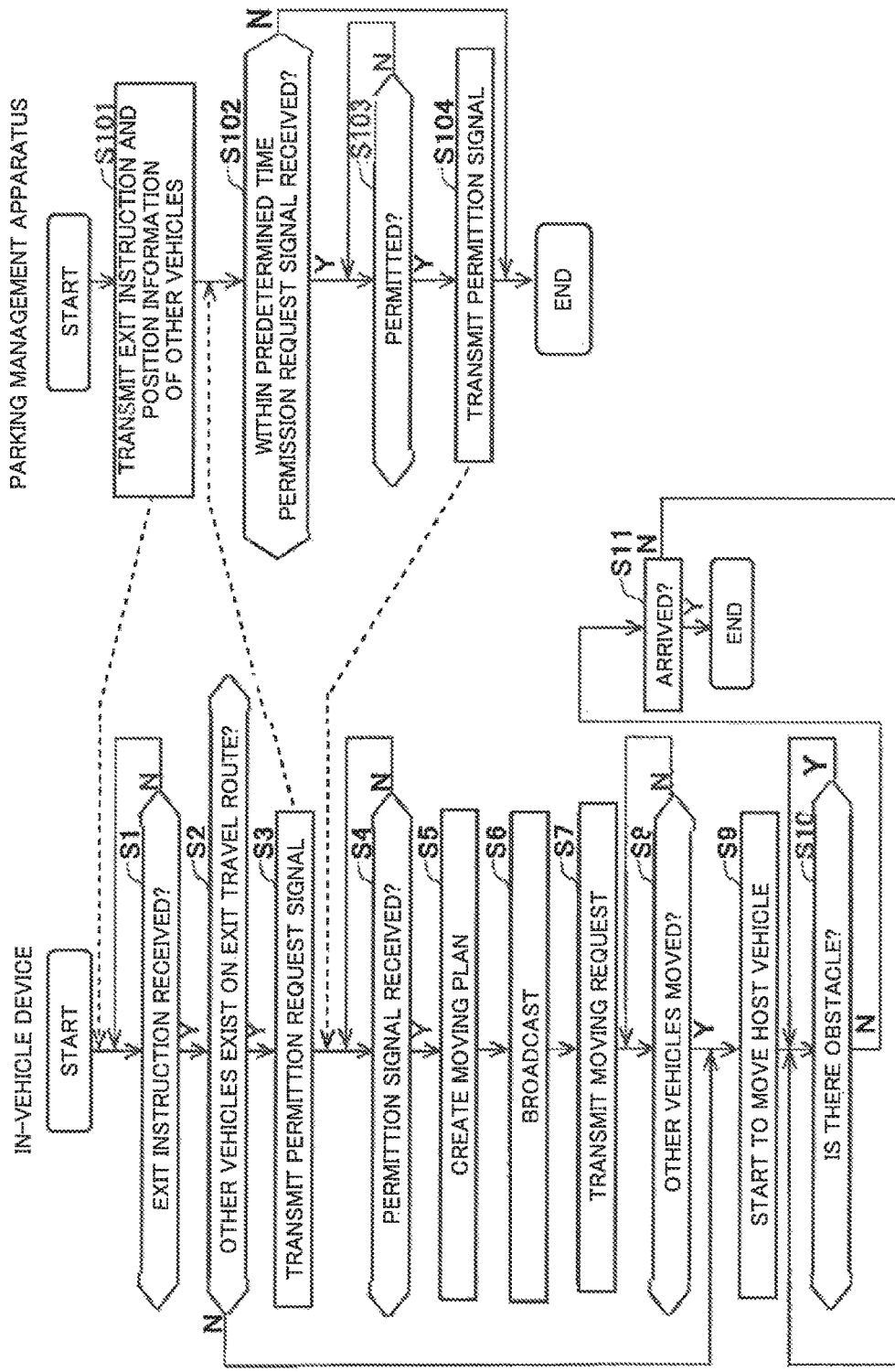
FIG. 3 is a flowchart illustrating an operation example related to exiting by the parking management system.

In the following, description will be made on a case in which the parking management apparatus 20 transmits the exit instruction to a vehicle V1 in the last row illustrated in FIG. 2. In the following description, each of the communication ECU 31 and the autonomous driving control ECU 33 may be referred to as an in-vehicle device in some cases. FIG. 3 is a flowchart illustrating an operation example related to exiting by the parking management system 200.

When the exit request signal is transmitted from the user terminal 10 to the receiver 21, the entry/exit indicator 22 of the parking management apparatus 20 transmits the exit instruction and position information of the other vehicles to the in-vehicle device of the vehicle V1 using the communicator 23 (a step S101).

On the other hand, the in-vehicle device of each vehicle parked within the parking area of the valet parking lot 100 stands by in a state capable of receiving communication from the parking management apparatus 20 and the in-vehicle devices of the other vehicles. The autonomous driving control ECU 33 of the vehicle V1 determines whether or not the exit instruction from the parking management apparatus 20 has been received by the communication ECU 31 (a step S1).

In a case where the exit instruction from the parking management apparatus 20 has been received, the autonomous driving control ECU 33 determines whether or not the other vehicles exist on an exit travel route R1 based on a vehicle size of the vehicle V1 stored by the autonomous driving control ECU 33 in a non-volatile manner, a detection result of the peripheral monitoring sensor 32 and the position information of the other vehicles transmitted from the parking management apparatus 20 (a step S2). In a case where the other vehicles do not exist on the exit travel route R1, a process proceeds to a step S9 described later. On the other hand, in a case where the other vehicles exist on the exit travel route R1, the process proceeds to a step S3 described later. In the situation illustrated in FIG. 2, since a vehicle V2 and a vehicle V3 that are different from the vehicle V1 exist on the exit travel route R1 of the vehicle V1, the process proceeds to the step S3 described later.

In the step S3, the autonomous driving control ECU 33 of the vehicle V1 transmits a permission request signal to the parking management apparatus 20 using the communication ECU 31. The permission request signal is a signal that requests permission for the in-vehicle device of the vehicle V1 to perform vehicle-to-vehicle communication with the other vehicles.

The entry/exit indicator 22 of the parking management apparatus 20 determines whether or not the communicator 23 has received the permission request signal from the vehicle V1 within a predetermined time after completing the process in the step S101 (a step S102). In a case where the communicator 23 has not received the permission request signal from the vehicle V1 within the predetermined time, the parking management apparatus 20 terminates the operation in the flowchart illustrated in FIG. 3. On the other hand, in a case where the communicator 23 has received the permission request signal from the vehicle V1 within the predetermined time, the entry/exit indicator 22 of the parking management apparatus 20 determines whether or not to permit the in-vehicle device of the vehicle V1 to perform the vehicle-to-vehicle communication with the other vehicles in consideration of the exit plans for the vehicles other than the vehicle V1, or the like (a step S103). In a case of giving no permission, the entry/exit indicator 22 of the parking management apparatus 20 is in a standby state until becoming ready to issue the permission. In a case of giving permission, the entry/exit indicator 22 of the parking management apparatus 20 transmits a permission signal to the in-vehicle device of the vehicle V1 using the communicator 23 (a step S104), and terminates the operation in the flowchart illustrated in FIG. 3.

The permission signal is a signal indicating that the in-vehicle device of the vehicle V1 is permitted to perform the vehicle-to-vehicle communication with the other vehicles, and includes information such as identification information and vehicle sizes of the other vehicles existing within a predetermined range from the vehicle V1. Since the in-vehicle device of the vehicle V1 can acquire the identification information of the other vehicles from the parking management apparatus 20 in this manner, it is not necessary for the in-vehicle device of the vehicle V1 to request the identification information from a communication partner before performing the vehicle-to-vehicle communication. Therefore, it is possible to simplify a procedure when the in-vehicle device of the vehicle V1 performs the vehicle-to-vehicle communication.

After completing the process in the step S3, the in-vehicle device of the vehicle V1 enters the standby state to receive the permission signal and determines whether or not the permission signal has been received (a step S4). When the communication ECU 31 of the vehicle V1 receives the permission signal, the process proceeds to a step S5. In this way, the in-vehicle device of the vehicle V1 can perform the vehicle-to-vehicle communication with the vehicle V2 and the vehicle V3 that exist on the exit travel route R1 by obtaining the permission for performing the vehicle-to-vehicle communication from the parking management apparatus 20. Since only the in-vehicle device permitted by the parking management apparatus 20 becomes a device that leads the vehicle-to-vehicle communication (a master device), it is possible to prevent any confusion from being caused by randomly performing the vehicle-to-vehicle communication.

In the step S5, the autonomous driving control ECU 33 of the vehicle V1 creates a moving plan for the vehicle V2 and the vehicle V3 that exist on the exit travel route R1 of the vehicle V1 based on the position information of the other vehicles transmitted from the parking management apparatus 20, the vehicle sizes of the other vehicles located within the predetermined range from the vehicle V1 and the like.

The moving plan for the vehicle V2 is a plan to move the vehicle V2 out of the exit travel route R1 of the vehicle V1. The moving plan for the vehicle V3 is a plan to move the vehicle V3 out of the exit travel route R1 of the vehicle V1. The moving plan includes, for example, a moving direction, a moving distance, a time limit to movement completion, and the like.

In a step S6 following the step S5, the autonomous driving control ECU 33 of the vehicle V1 broadcasts a signal indicating that the in-vehicle device of the vehicle V1 has a control authority concerning vehicle movement to all the other vehicles existing within a certain range from the vehicle V1 using the communication ECU 31. As a result, since all the other vehicles existing within the certain range from the vehicle V1 grasp that the in-vehicle device of the vehicle V1 is the device that leads the vehicle-to-vehicle communication (the master device), it is possible to more surely prevent any confusion from being caused by randomly performing the vehicle-to-vehicle communication. The "certain range" here may be the same as, or different from, the "predetermined range" in the permission signal.

In a step S7 following the step S6, the autonomous driving control ECU 33 of the vehicle V1 transmits a moving request to the vehicle V2 and the vehicle V3 using the communication ECU 31. The moving request includes the above-described moving plan. By transmitting the moving plan from the in-vehicle device of the vehicle V1 to the vehicle V2 and the vehicle V3, the vehicle V2 and the vehicle V3 can move out of the exit travel route R1 of the vehicle V1 even if the vehicle V2 and the vehicle V3 do not grasp the exit travel route R1 of the vehicle V1. In a case where the vehicle V2 and the vehicle V3 individually create self-moving plans, there is a possibility that the movement of the vehicle V2 and the vehicle V3 interfere with each other. Since the in-vehicle device of the vehicle V1 creates the moving plan for both the vehicle V2 and the vehicle V3, it is possible to prevent the movement of the vehicle V2 and the vehicle V3 from interfering with each other.

In a step S8 following the step S7, the autonomous driving control ECU 33 of the vehicle V1 determines whether or not the vehicle V2 and the vehicle V3 have moved out of the exit travel route R1 of the vehicle V1. For example, in a state in which the vehicle V2 and the vehicle V3 have not returned a signal for rejecting the moving request and when the time limit to the movement completion in the moving plan has passed, the autonomous driving control ECU 33 of the vehicle V1 may determine that the vehicle V2 and the vehicle V3 have moved out of the exit travel route R1 of the vehicle V1. In a case where the vehicle V2 and the vehicle V3 have received a special instruction from the parking management apparatus 20 or in a case where residual fuel is little, or the like, the vehicle V2 and the vehicle V3 reject the moving request.

Figure 4:
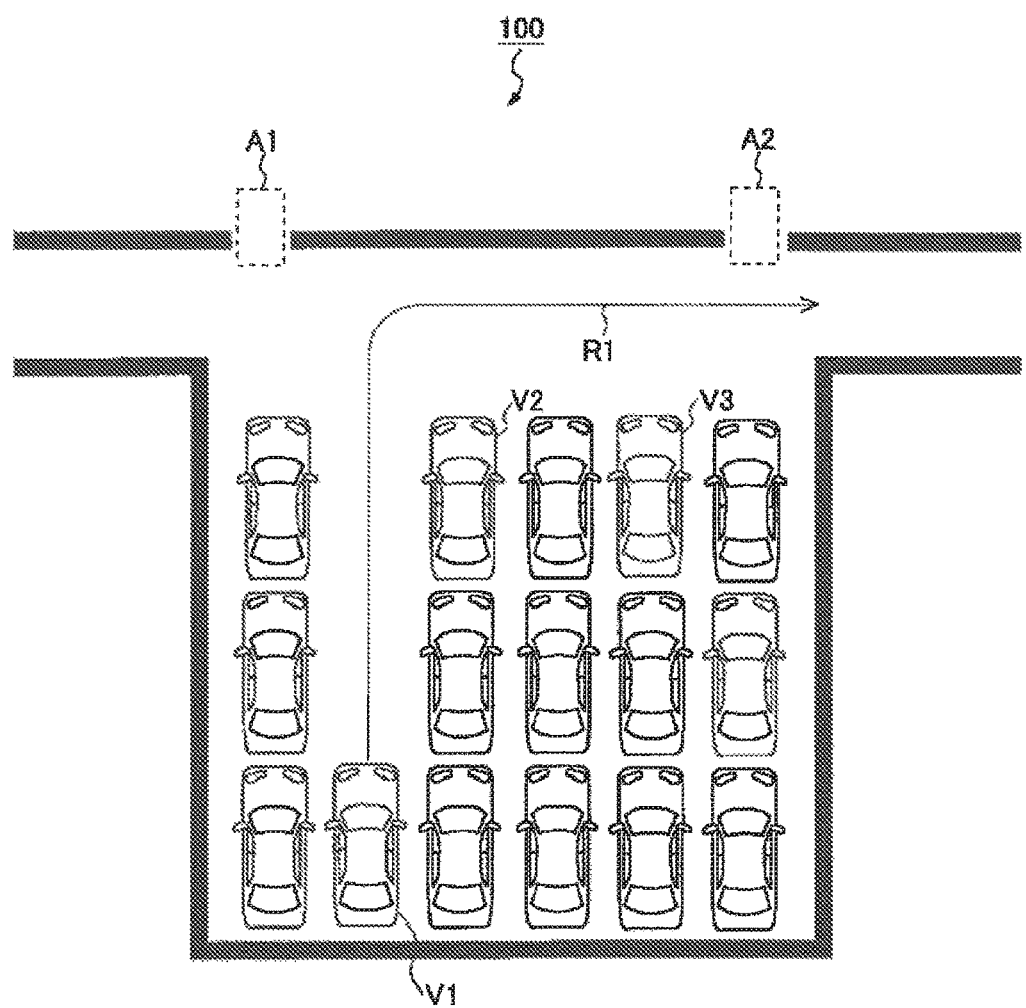
FIG. 4 is a top view illustrating the example of the parking situation in the valet parking lot.

In a case where the autonomous driving control ECU 33 of the vehicle V1 determines that the vehicle V2 and the vehicle V3 have moved out of the exit travel route R1 of the vehicle V1, the autonomous driving control ECU 33 of the vehicle V1 starts to move the vehicle V1 along the exit travel route R1 of the vehicle V1 using the vehicle control ECU 34 (a step S9). At a time at which the process shifts from the step S8 to the step S9, the vehicle V2 and the vehicle V3, for example, move to the parking positions illustrated in FIG. 4. In a case where a state in which the process cannot shift from the step S8 to the step S9 has continued for a predetermined period of time, the autonomous driving control ECU 33 of the vehicle V1 may transmit a signal indicating that the vehicle V1 cannot exit the parking lot to the parking management apparatus 20 using the communication ECU 31.

In a step S10 following the step S9, the autonomous driving control ECU 33 of the vehicle V1 determines whether or not there is an obstacle that hinders the vehicle V1 from traveling on the exit travel route R1 of the vehicle V1 based on the detection result of the peripheral monitoring sensor 32. The detection result of the peripheral monitoring sensor 32 is not two-dimensional information but three-dimensional information. Therefore, it is possible to determine that even an object existing on the exit travel route R1 of the vehicle V1 in two dimensions is not the obstacle, when the object exists in a higher position than a vehicle height of the vehicle V1, when the object has a lower ground height than a minimum ground height of the vehicle V1, and when the object has a narrower width than a width between left and right wheels of the vehicle V1. In a case where the in-vehicle device of the vehicle V1 knows in advance by the permission signal transmitted from the parking management apparatus 20 that the other vehicles have received the special instruction from the parking management apparatus 20 (for example, an earlier exit instruction than the vehicle V1, or the like) and would reject the moving request, the in-vehicle device of the vehicle V1 may regard such a vehicle as the obstacle instead of the vehicle existing on the exit travel route R1 of the vehicle V1.

In a case where the obstacle exists, the autonomous driving control ECU 33 of the vehicle V1 stops the vehicle V1 from traveling just before the obstacle using the vehicle control ECU 34. In a case where no obstacle exists or the obstacle no longer exists, the autonomous driving control ECU 33 of the vehicle V1 allows the vehicle V1 to travel using the vehicle control ECU 34.

The autonomous driving control ECU 33 of the vehicle V1 determines whether or not the vehicle V1 has arrived in the getting-on area A2 (a step S11).

In a case where the autonomous driving control ECU 33 of the vehicle V1 determines that the vehicle V1 has arrived in the getting-on area A2, the autonomous driving control ECU 33 of the vehicle V1 terminates the operation in the flowchart illustrated in FIG. 3.

In a case where the autonomous driving control ECU 33 of the vehicle V1 determines that, for example, the vehicle V2 and the vehicle V3 have moved out of the exit travel route R1 of the vehicle V1, the autonomous driving control ECU 33 of the vehicle V1 may broadcast a signal indicating that the above-described control authority has expired to all the other vehicles existing within the certain range from the vehicle V1 using the communication ECU 31. In a case where the autonomous driving control ECU 33 of the vehicle V1 determines that, for example, the vehicle V1 has arrived in the getting-on area A2, the autonomous driving control ECU 33 of the vehicle V1 may broadcast a signal indicating that the above-described control authority has expired to all the other vehicles existing within the certain range from the vehicle V1 using the communication ECU 31. The in-vehicle device of the vehicle that has received the signal indicating that the control authority has expired may transmit information on the parking position at a time of receiving the signal indicating that the control has expired to the parking management apparatus 20, and the parking management apparatus 20 may renew the position information of each vehicle. By broadcasting the signal indicating that the control authority has expired as described above, it is possible to prevent a defect that the in-vehicle device of the vehicle other than the vehicle V1 cannot become the device that leads the vehicle-to-vehicle communication (the master device) although the in-vehicle device of the vehicle other than the vehicle V1 has been permitted to perform the vehicle-to-vehicle communication with the other vehicles by the parking management apparatus 20.

According to the operation example related to exiting by the parking management system described above, in a case where the vehicle V2 and the vehicle V3 exist on the exit travel route R1 of the vehicle V1, it is possible to move the vehicle V2 and the vehicle V3 out of the exit travel route R1 of the vehicle V1. Therefore, it is possible to allow the vehicle V1 to smoothly exit the parking lot even under a situation that an efficient parking is performed. Since the movement of the vehicle V2 and the vehicle V3 is not performed according to an instruction of the parking management apparatus 20 but is performed according an instruction in the vehicle-to-vehicle communication with the vehicle V1, it is possible to reduce communication frequency between the parking management apparatus 20 and the vehicles.

Even if there is a gap between the position information of the vehicles grasped by the parking management apparatus 20 and current situations, since the detection result of the peripheral monitoring sensor 32 of the vehicle V1 can be reflected on contents of the instruction from the vehicle V1 to the vehicle V2 and the vehicle V3, it is possible to reduce a risk of collision between the vehicles.

<3. Modification Example>

The above embodiment is merely an illustrative example in all respects and should be considered to be nonrestrictive, and the technological scope of the invention is indicated not by the description of the above embodiment but rather by the scope of the claims, and it should be understood to include all modifications with an equivalent meaning to and within the scope the claims.

Figure 5:
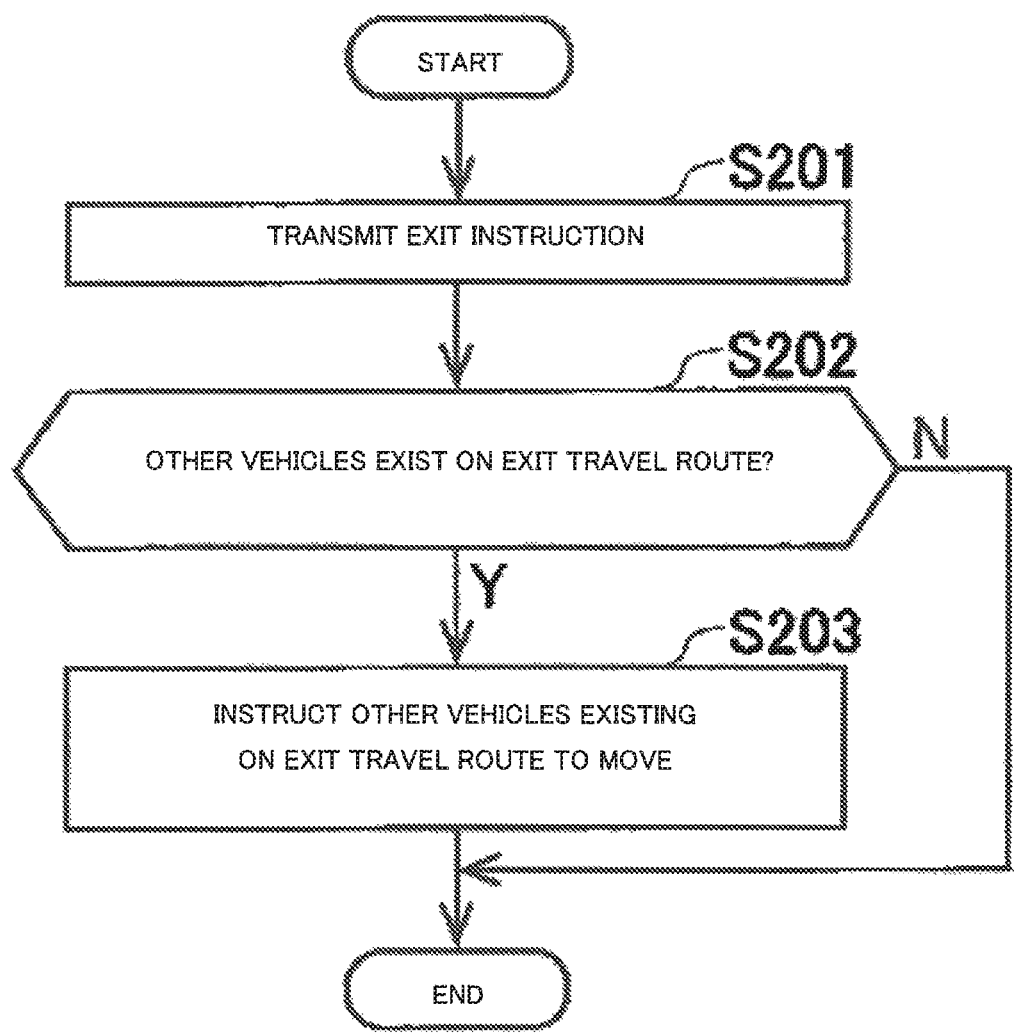
FIG. 5 is a flowchart illustrating an operation example related to exiting by a parking management apparatus.

For example, in the above-described embodiment, the in-vehicle device requests the other vehicles to move using the vehicle-to-vehicle communication, but the parking management apparatus 20 may instruct the other vehicles to move. In this case, as illustrated in FIG. 5, in a case where the parking management apparatus 20 receives the exit request signal from the user terminal 10, the parking management apparatus 20 transmits the exit instruction to the in-vehicle device that is mounted on the vehicle requested to exit the parking lot (a step S201). The parking management apparatus 20 determines whether or not the other vehicles exist on the exit travel route based on grasped position information of the vehicles (a step S202). In a case where the other vehicles do not exist on the exit travel route, the parking management apparatus 20 terminates the operation in the flowchart illustrated in FIG. 5. On the other hand, in a case where the other vehicles exist on the exit travel route, the parking management apparatus 20 instructs the other vehicles existing on the exit travel route to move (a step S203), and then terminates the operation in the flowchart illustrated in FIG. 5. The other vehicles that have moved according to the instruction of the parking management apparatus 20 transmit the position information after the movement completion to the parking management apparatus 20, and the parking management apparatus 20 renews the position information of each vehicle.

According to the operation in the flowchart illustrated in FIG. 5, it is possible to allow the vehicles to smoothly exit the parking lot even under a situation that an efficient parking is performed. Furthermore, according to the operation in the flowchart illustrated in FIG. 5, it is not necessary for the in-vehicle device of the vehicle to have a vehicle-to-vehicle communication function.

For example, when a situation notification request signal is transmitted from the user terminal 10 to the vehicle 30 via the parking management apparatus 20, the autonomous driving control ECU 33 may create a situation notification signal according to the situation notification request signal, and return the situation notification signal to the user terminal 10 via the parking management apparatus 20. Contents of the situation notification signal may include examples such as "during the movement to the getting-on area A2" and "during the standby state to move to the getting-on area A2". The autonomous driving control ECU 33 may store, in a non-volatile manner, a number of times of the movement by the instruction of the in-vehicle devices of the other vehicles or the parking management apparatus 20 except the entry to and exit from the parking lot, and may include the number of times of the movement in the situation notification signal.

In the valet parking lot 100, a benefit according to the number of times of the movement by the instruction of the in-vehicle devices of the other vehicles or the parking management apparatus 20 except the entry to and exit from the parking lot may be offered. For example, the benefit that as the number of times of the movement by the instruction of the in-vehicle devices of the other vehicles or the parking management apparatus 20 except the entry to and exit from the parking lot increases, parking fee is discounted can be considered.

While the invention has been shown and described in detail, the foregoing description is in all aspects illustrative and not restrictive. It is therefore understood that numerous other modifications and variations can be devised without departing from the scope of the invention.

What is claimed is:

1. An in-vehicle device that is mounted on a host vehicle, the in-vehicle device comprising:
    a receiver that receives an exit instruction; and
    an electronic control unit that is configured to: (a) determine whether or not at least one other vehicle exists on an exit travel route from a current parking position of the host vehicle to a getting-on area when the exit instruction has been received by the receiver; (b) request the at least one other vehicle existing on the exit travel route to move out of the exit travel route using vehicle-to-vehicle communication in a case where the electronic control unit determines that the at least one other vehicle exists on the exit travel route, wherein the at least one other vehicle is configured to accept or reject the request to move out of the exit travel route, the at least one other vehicle rejecting the request when a residual fuel amount of the at least one other vehicle is below a threshold; and (c) move the host vehicle on the exit travel route in a case that the at least one other vehicle accepts the request.

2. The in-vehicle device according to claim 1,
    wherein in a case where the electronic control unit determines that the at least one other vehicle exists on the exit travel route, the electronic control unit creates a moving plan for the at least one other vehicle existing on the exit travel route, and transmits the moving plan to the at least one other vehicle existing on the exit travel route when requesting the at least one other vehicle to move out of the exit travel route.

3. A parking management system comprising:
    an in-vehicle device that is mounted on a host vehicle, the in-vehicle device having i) a receiver that receives an exit instruction, and ii) an electronic control unit that is configured to (a) determine whether or not at least one other vehicle exists on an exit travel route from a current parking position of the host vehicle to a getting-on area when the exit instruction has been received by the receiver; (b) request the at least one other vehicle existing on the exit travel route to move out of the exit travel route using vehicle-to-vehicle communication in a case where the electronic control unit determines that the at least one other vehicle exists on the exit travel route, wherein the at least one other vehicle is configured to accept or reject the request to move out of the exit travel route, the at least one other vehicle rejecting the request when a residual fuel amount of the at least one other vehicle is below a threshold; and (c) move the host vehicle on the exit travel route in a case that the at least one other vehicle accepts the request; and
    a parking management apparatus that transmits the exit instruction,
    wherein the in-vehicle device acquires identification information of the at least one other vehicle existing on the exit travel route from the parking management apparatus.

4. The parking management system according to claim 3,
    wherein the in-vehicle device performs the vehicle-to-vehicle communication with the at least one other vehicle existing on the exit travel route by obtaining a permission to perform the vehicle-to-vehicle communication from the parking management apparatus.

5. The parking management system according to claim 4,
    wherein in a case where the in-vehicle device has obtained the permission to perform the vehicle-to-vehicle communication from the parking management apparatus, the in-vehicle device broadcasts a signal indicating that the in-vehicle device has a control authority concerning a vehicle movement to all the other vehicles existing within a certain range from the host vehicle.

6. The parking management system according to claim 5,
    wherein in a case where the at least one other vehicle existing on the exit travel route have moved out of the exit travel route, the in-vehicle device broadcasts a signal indicating that the control authority has expired.

7. The parking management system according to claim 5,
    wherein in a case where the host vehicle has arrived in the getting-on area, the in-vehicle device broadcasts a signal indicating that the control authority has expired.

8. A parking management method comprising the steps of:
    (a) transmitting an exit instruction to an in-vehicle device that is mounted on a host vehicle;
    (b) determining, by a processor of the in-vehicle device, whether or not other vehicles at least one other vehicle exists on an exit travel route from a current parking position of the host vehicle to a getting-on area; and
    (c) instructing, by the processor of the in-vehicle device, the at least one other vehicle existing on the exit travel route to move out of the exit travel route using vehicle-to-vehicle communication in a case where it is determined that the at least one other vehicle exists on the exit travel route, wherein the at least one other vehicle is configured to accept or reject the request to move out of the exit travel route, the at least one other vehicle rejecting the request when a residual fuel amount of the at least one other vehicle is below a threshold; and
    (d) instructing, by the processor of the in-vehicle device, the host vehicle to move on the exit travel route in a case that the at least one other vehicle accepts the request.

9. The parking management method according to claim 8,
    wherein in a case where the step (b) determines that the at least one other vehicle exists on the exit travel route, the step (c) creates a moving plan for the at least one other vehicle existing on the exit travel route, and transmits the moving plan to the at least one other vehicle existing on the exit travel route when requesting the at least one other vehicle to move out of the exit travel route.

10. An in-vehicle device that is mounted on a host vehicle, the in-vehicle device comprising:
   a receiver that receives an exit instruction; and
   an electronic control unit that is configured to: (a) determine whether or not at least one other vehicle exists on an exit travel route from a current parking position of the host vehicle to a getting-on area when the exit instruction has been received by the receiver; (b) request the at least one other vehicle existing on the exit travel route to move out of the exit travel route using vehicle-to-vehicle communication in a case where the electronic control unit determines that the at least one other vehicle exists on the exit travel route, wherein the at least one other vehicle is configured to accept or reject the request to move out of the exit travel route, the at least one other vehicle rejecting the request when a residual fuel amount of the at least one other vehicle is below a threshold; and (c) move the host vehicle on the exit travel route in a case that the at least one other vehicle accepts the request,
   wherein the electronic control unit transmits a signal to a parking management apparatus that manages a parking lot in which the host vehicle is located indicating that the host vehicle cannot exit the parking lot when, after a predetermined time period, the electronic control unit determines that at least one of the at least one other vehicle was not able to move out of the exit travel route.

11. The in-vehicle device according to claim 10,
   wherein in a case where the electronic control unit determines that the at least one other vehicle exists on the exit travel route, the electronic control unit creates a moving plan for the at least one other vehicle existing on the exit travel route, and transmits the moving plan to the at least one other vehicle existing on the exit travel route when requesting the at least one other vehicle to move out of the exit travel route.

* * * * *